March 23, 1954 P. BLUMBERG 2,673,090
HIGHWAY MARKING MACHINE
Filed March 9, 1949 2 Sheets-Sheet 1
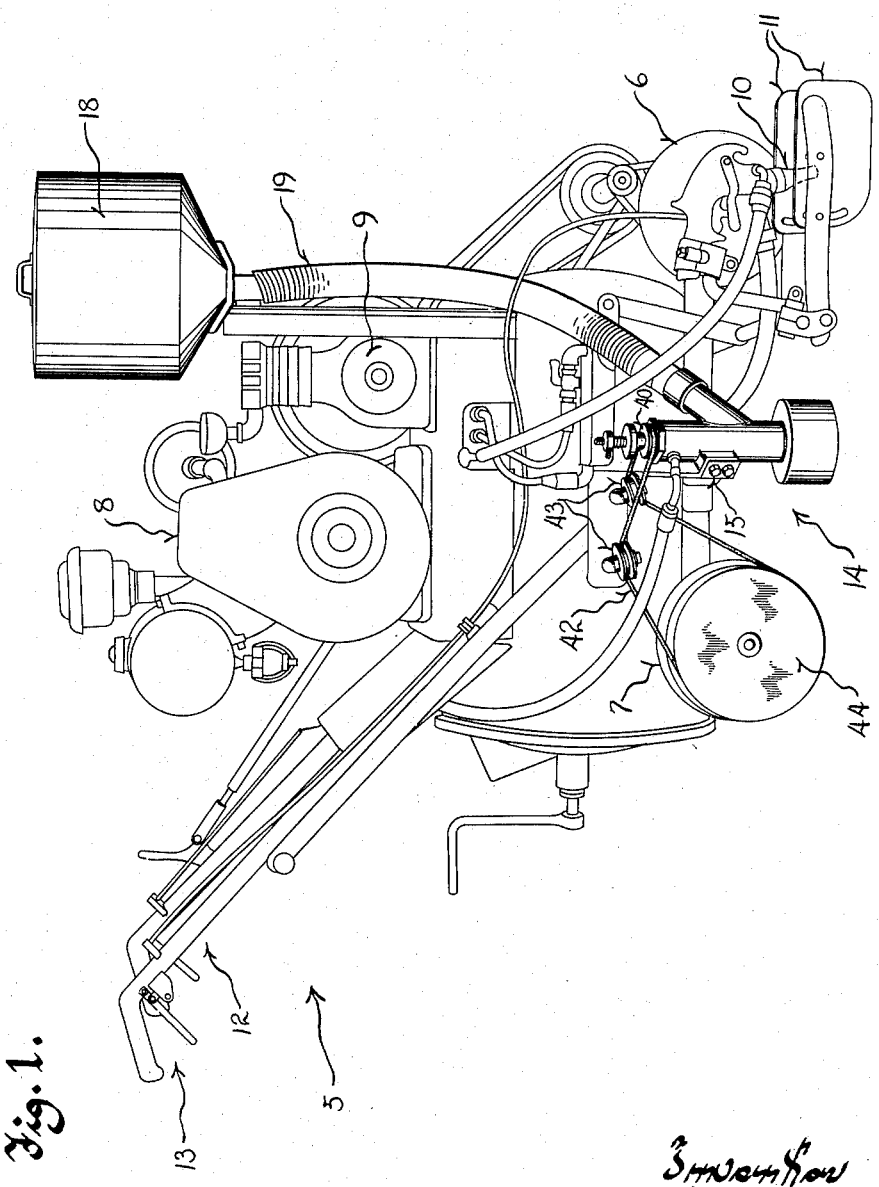

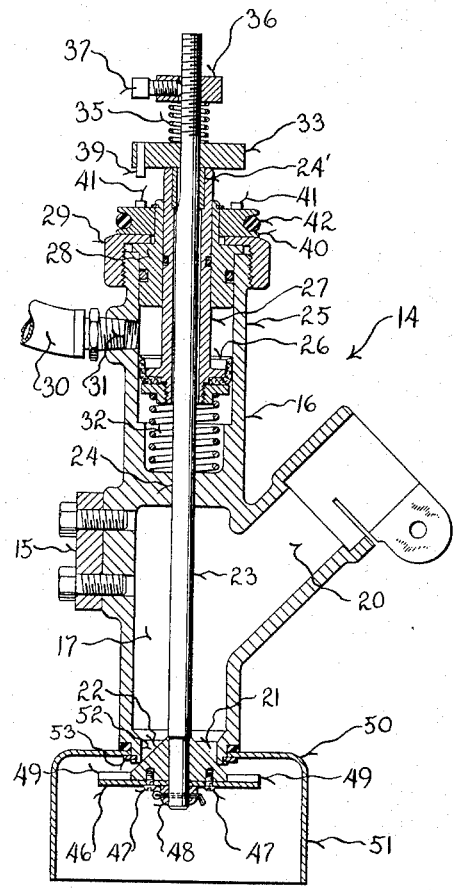
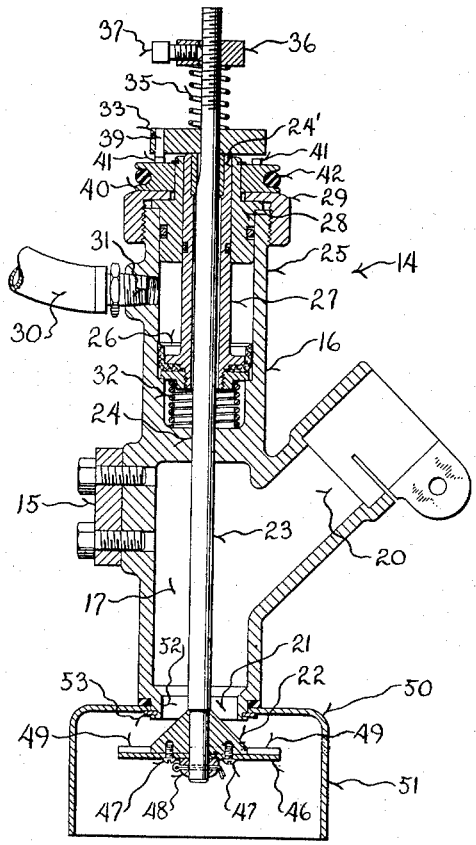
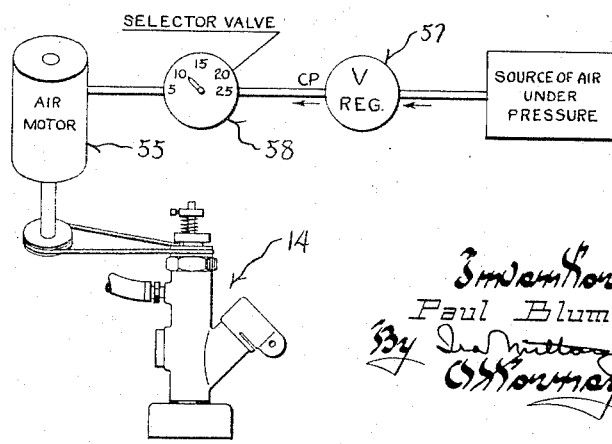

Patented Mar. 23, 1954

2,673,090

UNITED STATES PATENT OFFICE 2,673,090

HIGHWAY MARKING MACHINE

Paul Blumberg, New Holstein, Wis., assignor to Meili-Blumberg Corporation, New Holstein, Wis., a corporation of Wisconsin Application March 9, 1949, Serial No. 80,400

3 Claims. (Cl. 275—8)

1

This invention relates to highway marking machines and refers more particularly to marking machines equipped with dispensing mechanism by which extremely small light reflecting beads of glass are deposited upon the freshly painted stripe laid down by the machine so as to greatly increase the light reflectancy of said stripe at night.

One such highway marking machine is shown and described in the Rodli et al. Patent No. 2,278,-948, and up to the present time the machine of this patent has been nearly the only device of its kind available for simultaneously painting highway stripes and embedding the light reflecting beads in the painted stripes.

In the machine of the Rodli et al. patent, the glass beads are transferred from a supply hopper to the freshly painted stripe by a rotor positioned behind the paint spray nozzle and having a series of grooves in its exterior to receive the beads from the supply hopper and successively dump charges of beads onto the painted stripe by rotation of the rotor. This manner of dispensing the beads has been found highly objectionable due to its inability to achieve uniform distribution of the beads over the entire surface of the painted stripe laid down by the machine. The failure of the machine in this respect resulted from the fact that the circumferential spacing of the grooves in the exterior of the rotor caused the beads to be dispensed onto the painted stripe in a more or less intermittent fashion with many beads dropping onto the stripe when each rotor groove was brought to a discharge position, and with no beads being dispensed during the time required for continued rotation of the rotor to bring the next succeeding groove to a discharge position.

In order to overcome this objection it is conceivable that the rotor grooves could be fashioned to discharge an excess of beads upon the painted stripe, to thus enable more beads to reach the normally thinly coated areas of the stripe. However, this expedient would undoubtedly result in the waste of considerable quantities of beads, which are quite expensive.

Another serious objection to machines such as that of the aforementioned patent is their utter inability to achieve dispensing of the beads at rates proportional to the different speeds at which the marking machine may be operated. Because of this fact it was necessary to drive the bead dispensing rotor of the machine at a substantially uniform rate of speed and to limit the speed of travel of the marking machine to

2 a predetermined speed at which the most uniform dispensing of beads was obtained. Hence in some instances the speeds of travel of the dispensing machines were limited to as little as two to five miles per hour.

With these objections to past bead dispensing machines in mind it is an object of the present invention to provide a bead dispensing apparatus for use with highway marking machines by which the beads are dispensed at a rate proportional to the speed of travel of the machine.

It is another object of this invention to provide improved bead dispensing mechanism which may be attached to any type of highway marking machine and by which the beads are distributed with a high degree of uniformity onto the painted stripe laid down by the machine.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiment of the invention constructed according to the best modes so far devised for the practical application of the principles thereof, and in which:

Figure 1 is a perspective view of a small highway marking machine of the type adapted to be guided by an operator walking behind it, and showing the application of the dispensing mechanism of this invention thereto;

Figure 2 is a longitudinal sectional view through the dispenser shown in Figure 1 and illustrating the same in an inoperative condition;

Figure 3 is a longitudinal sectional view similar to Figure 2 showing the dispenser in an operative condition; and Figure 4 is a diagrammatic view illustrating a slightly modified manner of controlling the rate at which beads are dispensed by the mechanism.

Referring now more particularly to the accompanying drawings in which like numerals indicate like parts throughout the several views, the numeral 5 generally designates a small highway marking machine of the type which is adapted to be guided by an operator walking behind it. The machine has a wheeled chassis with wheels 6 and 7 at its front and rear respectively, and has a small internal combustion engine 8 by which the machine is self propelled. The engine 8 also drives an air compressor 9 which furnishes the pressure required to force paint contained in a suitable reservoir on the machine from a spray nozzle 10 near the front of the machine but located a distance to one side of the front wheel 6. The nozzle 10 is situated between a pair of guide plates 11 which define the width of the stripe to be painted upon the highway.

The machine illustrated is also provided with handlebars 12 which enable the operator walking behind the machine to guide its travel when laying down straight or curved stripes upon the highway. It will be readily appreciated that suitable controls generally designated 13 mounted upon the handlebars and readily accessible to the operator are provided for controlling not only the travel of the machine but also the spraying of paint from the spray nozzle 10.

The bead dispensing mechanism 14 of this invention is in the nature of an attachment mounted on one side of the machine as by a bracket 15 attached to the chassis and by which the mechanism is positioned directly behind the spray nozzle 10 and centered with respect to the guide plates 11 at opposite sides of the nozzle.

Referring to Figures 2 and 3, it will be seen that the dispensing mechanism comprises an upright hollow body 16 having a bead dispensing chamber 17 in its lower end into which small light-reflecting beads of glass are adapted to be fed from a hopper 18 supported by the marking machine at an elevation above the dispensing mechanism and connecting therewith through a length of flexible conduit 19 as shown in Figure 1. The lower end of the conduit 19 communicates with an inlet opening 20 in the side of the dispenser body near the upper end of the dispensing chamber 17 so that the dispensing chamber is maintained substantially full of beads during operation of the machine.

The beads are adapted to issue from the dispensing chamber through a hole 21 in the bottom of the body, and a frusto-conical valve plug 22 having its small diameter end uppermost is adapted to enter the hole from the underside of the body to close the hole whenever the machine is at rest or whenever the dispensing of beads is to be terminated.

The valve plug 22 is fixed on the lower end of a valve stem 23 which projects upwardly through the dispensing chamber 17 and a bearing 24 in the body at the upper end of the chamber, to have its upper end portion pass longitudinally through a cylinder 25 formed on the upper end of the body. The valve stem is freely received in the bearing 24 so that it may be moved downwardly or upwardly to control the position of the valve plug and consequently the discharge of beads from the dispensing chamber.

According to the present invention, the valve is actuated at least in part by fluid pressure, or more particularly, by compressed air from the source thereof on the marking machine. For this purpose the dispensing mechanism is provided with a plunger 26 slidable up and down in the cylinder 25 and having a tubular stem 27 loosely encircling the valve stem and projecting upwardly above the top of the cylinder. A bushing 24' pressed into the upper end of the plunger stem cooperates with the bearing 24 to provide a two point support by which the valve stem 23 is freely slidably and rotatably mounted on the dispenser body.

The upper end of the cylinder 25 is closed by a bushing-like element 28 which also serves as a bearing in which the plunger stem is freely slidably received; and a nut 29 threaded over the exterior of the cylinder holds an annular flange on the bushing-like element clamped against the upper extremity of the cylinder to retain the bearing-like element in place.

Air under pressure from the source thereof on the machine is adapted to be led into the cylinder through a pressure line 30 connecting with a nipple 31 in the side of the cylinder near its upper end and above the plunger 26 so that whenever the interior of the cylinder is subjected to pressure the plunger will be forced downwardly. Downward motion of the plunger, however, is opposed by a compression spring 32 encircling the valve stem and confined in the lower end of the cylinder between the bearing 24 and the underside of the plunger. Hence, it will be apparent that the spring 32 yieldingly biases the plunger to an inoperative raised position such as illustrated in Figure 2.

In the inoperative position of the mechanism shown in Figure 2, the plunger is adapted to hold the valve stem in its raised position at which the valve plug closes the discharge opening at the bottom of the dispensing chamber 17. For this purpose the valve stem is provided with a collar 33 having a D-shaped hole to receive the upper end of the valve stem, and since the upper end of the valve stem has a flat formed on one side thereof corresponding to the D-shaped hole in the collar, it will be apparent that the collar is slidably but nonrotatably connected with the stem. The collar 33 rests upon the upper end of the plunger stem so that it is raised and lowered with the plunger while remaining nonrotatably connected with the valve stem.

Raising of the collar 33 by the plunger is translated into upward motion of the valve stem through a compression spring 35 seated on the top of the collar 33 and bearing against the underside of an adjusting collar 36 threaded onto the upper extremity of the valve stem and locked thereon in any desired position of adjustment as by a set screw 37. Hence, both springs 32 and 35 cooperate with one another to normally hold the valve closed and preclude the dispensing of beads whenever the cylinder 25 is disconnected from the source of air under pressure.

The supply of air under pressure to the cylinder 25 may be controlled by the same valve (not shown) which initiates spray painting of the highway stripe, or a separate valve may be provided to render control of the dispensing apparatus independent of the spray painting, in which case painted stripes may be laid down without the dispensing of beads thereon. In either event, however, when the upper end of the cylinder 25 is subjected to air pressure, the plunger 26 will be forced downwardly against its spring 32, and the collar 33 supported by the plunger drops downwardly with the plunger.

The downward motion of the collar 33 is limited by the engagement of a clutch pin 39 projecting from the underside of the collar with the upper face of a pulley 40 seated upon the top of the retaining nut 29 and freely rotatably journalled upon an upwardly extending hub on the bushing-like element 28. Thus the lower position of the collar 33 is positively defined. Whenever the plunger and the collar are lowered to positions shown in Figure 3, the valve stem 23 descends by gravity allowing the valve plug 22 to uncover the opening 21 at the bottom of the dispensing chamber 17 so that beads in the dispensing chamber issue therefrom for dispensing upon the painted stripe laid down by the machine.

Consequently, the extent to which the valve opens roughly determines the rate at which beads are permitted to discharge from the dispensing chamber, and it is for this reason that the stop collar 36 is adjustable axially of the valve stem.

Assuming that the collar 36 occupies a position on the valve stem to normally hold the spring 35 compressed only a small amount, as in Figure 2, it will be apparent that the valve stem will have a total downward travel less than that of the collar 33 by an amount roughly corresponding to the difference between the compressed and free lengths of the spring 35. Hence, the bead dispensing rate may be lowered by threading the stop collar 36 farther down on the valve stem to further compress and shorten the spring 35 so as to limit the extent of valve opening. Likewise, if it is desired to increase the bead dispensing rate, the stop collar is adjusted to a higher position on the valve stem to increase the compressed length of spring 35 and correspondingly increase the extent of valve opening. The adjustment provided by the stop collar 36, however, is a relatively coarse adjustment of the dispensing rate.

Whenever the plunger 26 is forced downwardly by air pressure in the cylinder 25 the clutch pin 39 on the collar 33 engages the upper face of the pulley 40, as stated, and is brought into driving engagement with one of a plurality of driving lugs 41 projecting up from the top of the pulley to establish a rotation transmitting connection between the pulley and the valve stem through the collar 33.

Referring to Figure 1 it will be seen that the pulley 40 is connected by means of a belt 42 trained over a plurality of idler pulleys 43 with a sheave 44 fixed to the rear axle of the marking machine so as to rotate in unison with the rear wheels 7 thereof. Consequently when the plunger 26 is held depressed in its cylinder 25 by air pressure, the valve 22 will be open and the valve stem will be rotated at a rate of speed which is directly proportional to the speed of travel of the highway marking machine.

Fixed to and rotatable with the valve stem is a spreader plate or disc 46. The spreader plate is detachably secured to the underside of the valve plug by screws 47 and a nut 48 pinned to the lower extremity of the shaft beneath the disc. This spreader plate extends outwardly beyond the sides of the valve plug and has a series of cleat-like ribs 49 disposed radially on its upper surface.

When the valve is open, as shown in Figure 3, and rotated at a speed proportional to the speed of travel of the marking machine, the beads in the distributing chamber 17 flow downwardly through the opening 21 at the bottom of the chamber and slide outwardly over the conical sides of the valve plug 22 and onto the upper surface of the distributing plate from which they are thrown outwardly by centrifugal force at a rate determined by the rate of rotation of the valve stem and consequently the rate of travel of the marking machine.

Hence, if the marking machine is traveling at a relatively slow rate of speed, the speed of rotation of the spreader plate will be correspondingly slow and the rate at which beads are carried away from the opening 21 in the dispenser body by the spreader plate is limited accordingly. If the marking machine is traveling at a faster rate of speed, the spreader plate will be rotated at a correspondingly faster rate to draw beads away from the opening 21 at a faster rate.

For moderate changes in the speed of travel of the marking machine, therefore, the rate of dispensing of the beads will be substantially proportional to the speed at which the machine travels, and adjustment of the extent of valve opening by the stop collar 36 is necessary only in the event the machine is to be operated at speeds which differ substantially from one another.

In order to assure even distribution of the beads upon the painted stripe laid down by the machine, the lower end of the dispenser body has a substantially inverted cup-shaped distributing member 50 secured thereto. The open end of the cup-shaped member faces downwardly and its side wall 51 completely encircles the spreader plate and preferably has a diameter which corresponds to the spacing between the guide plates 11.

The cup-like distributing element 50 is readily detachably mounted on a reduced neck 52 projecting from the lower end of the body, by means of a spring retaining washer 53 which is rendered readily accessible when the distributing plate 46 is removed from the lower end of the valve stem.

During operation of the marking machine the position of the parts of the dispensing device are as shown in Figure 3, and the small diameter beads issuing from the dispensing chamber 17 are thrown outwardly by the spreader plate 46 against the inner wall 51 of the distributing member 50 at a rate determined largely by the rate of travel of the marking machine. This causes the beads to be deflected or bounced off the inner wall of the distributing element and to descend in a cloud of more or less uniform density onto the freshly painted stripe laid down by the machine regardless of moderate changes in the rate of travel of the machine.

Whenever the supply of air to the cylinder 25 is shut off the spring 32 forces the plunger upwardly and effects closing of the valve to stop the dispensing of beads.

It will also be appreciated that whenever it becomes necessary to replace the cup-like distributing element with another, either smaller or larger in diameter to correspond to the width of stripe to be painted by the machine, it is also preferable to employ a spreader plate of a diameter roughly proportional to the diameter of the cup so as to achieve maximum uniformity of distribution of the beads thrown outwardly against the cup by the plate.

In the embodiment of the invention illustrated in Figure 4 a modified control system is shown for coordinating the rate of rotation of the spreader plate with the rate of travel of the marking machine. This system is particularly well adapted for use on large marking apparatus of the type which is used for country highways, although it may be incorporated in the smaller machines of the type shown to replace the belt drive for the spreader plate. The larger machines may also be equipped with a plurality of spray nozzles to lay down a number of painted strips on the highway, and one such dispensing device 14 of this invention would, of course, be required for each of the paint spray nozzles, located directly behind the guide plates which determine the widths of the stripes laid down by the machine.

For these larger machines it may be undesirable to rotatably connect the valve stem with one of the wheels of the apparatus, and instead, the valve stem may be driven by an air motor 55 connected with the source of air under pressure through a constant pressure regulating valve 57 and a selector valve 58 by which the speed of the air motor can be regulated to correspond with the rate of travel of the marking apparatus. Hence, if the apparatus is traveling at a speed of ten miles an hour the selector valve should be adjusted to regulate the supply of air to the air motor 55 preferably by setting the indicator of the valve to a designation 10 so as to assure rotation of valve stem of the dispensing device at a rate of speed which is proportional to the rate of travel of the marking apparatus. In this manner the speed of rotation of the valve stem may be coordinated with the speed of travel of the marking apparatus over a range from approximately five miles an hour to twenty-five miles per hour or more so as to assure uniform dispensing of beads upon the painted stripe or stripes laid down by the apparatus regardless of the speed of its travel.

From the foregoing description taken in connection with the accompanying drawings, it will be readily apparent to those skilled in the art that this invention provides a relatively simple attachment for highway marking machines by which light reflecting beads may be uniformly embedded in the stripes laid down by the machines regardless of the rate of their travel.

What I claim as my invention is:

1. In a dispenser for granular materials: an upright dispenser body having a dispensing chamber in its lower end which opens through a port in the bottom of the dispenser body; means on the upper end of the body defining a cylinder; a plunger in the cylinder slidable up and down therein and biased toward a raised position; means on the side of the cylinder for connecting the same with a source of fluid pressure by which the plunger is forced downwardly in the cylinder against the biasing force acting thereon; a hollow stem on the plunger projecting upwardly through the top of the cylinder; a valve stem slidably and rotatably received inside the plunger stem and having its upper end extending above the upper end of the plunger stem and its lower end extending through the dispensing chamber and projecting through said port so as to be disposed at the underside of the dispenser body; a clutch element on the upper projecting end of the valve stem adapted to rest upon the upper end of the plunger stem, said clutch element being slidably but nonrotatably connected with the valve stem; a shoulder on the upper extremity of the valve stem; a spring confined between said shoulder and the clutch element and adapted to hold the valve stem raised in the raised position of the plunger, whereby downward motion of the plunger in consequence to subjection of the cylinder to fluid pressure causes the clutch element and the valve stem to move downwardly; a second clutch element rotatably carried by the cylinder and operatively engaged by the first designated clutch element by downward motion of the plunger in the cylinder to establish a rotation transmitting connection between said second clutch element and the valve stem, said second clutch element being adapted to be connected with a source of torque; a valve plug carried by the valve stem at its lower end and engageable with the valve body to close the port therein in the raised position of the valve stem so that lowering of the valve stem opens the valve and permits granular material in the dispensing chamber to discharge from the body; and a spreader plate connected to the lower end of the valve stem and onto which the granular material discharges to be thrown laterally outwardly by the plate in consequence to rotation of the valve stem.

2. The dispenser set forth in claim 1 further characterized by the provision of means on the lower end of the dispenser body providing a substantially annular wall surrounding the spreader plate and against which the granular material thrown outwardly by the plate impinges to be substantially evenly distributed over a predetermined area of a surface upon which the material is to be dispensed.

3. In a highway marking machine for spreading reflective beads upon freshly painted stripes upon a road surface: a source of air under pressure; a substantially horizontal spreader plate carried by the machine for rotation on a substantially vertical axis; means, including a hopper and a duct communicated with the hopper and debouching above the spreader plate, for feeding light-reflecting beads onto the top surface of the spreader plate; an air motor connected with said source of air under pressure to be driven thereby; means for drivingly connecting said air motor with the spreader plate whereby beads fed onto the top surface of the plate are thrown laterally outwardly therefrom by centrifugal force; and a substantially annular upright distributing element surrounding said spreader plate in substantially uniformly spaced relation to the periphery thereof and against which the beads thrown outwardly by the plate impinge to be deflected substantially uniformly throughout the space beneath the spreader plate and defined by said distributing element before falling to the roadway.

PAUL BLUMBERG.

References Cited in the file of this patent

UNITED STATES PATENTS

| Number | Name | Date |
| --- | --- | --- |
| 883,564 | Parrish | Mar. 31, 1908 |
| 1,459,915 | Koehmstedt | June 26, 1923 |
| 2,057,768 | De Motte | Oct. 20, 1936 |
| 2,278,948 | Rodli et al. | Apr. 7, 1942 |
| 2,369,983 | Rodli et al. | Feb. 20, 1945 |
| 2,387,362 | Stewart | Oct. 23, 1945 |
| 2,593,960 | Ballow | Apr. 22, 1952 |

FOREIGN PATENTS

| Number | Country | Date |
| --- | --- | --- |
| 5,715 | Great Britain | Mar. 6, 1914 |